(12) United States Patent
Kaneko et al.

(10) Patent No.: US 8,011,068 B2
(45) Date of Patent: Sep. 6, 2011

(54) STRUCTURE FOR ATTACHING PROTECTIVE MEMBER TO A SUPPORT

(75) Inventors: Tatsuya Kaneko, Tokyo (JP); Noriaki Kojima, Tokyo (JP)

(73) Assignee: Newfrey LLC, Newark, DE (US)

( * ) Notice: Subject to any disclaimer, the term of this patent is extended or adjusted under 35 U.S.C. 154(b) by 584 days.

(21) Appl. No.: 11/855,407

(22) Filed: Sep. 14, 2007

(65) Prior Publication Data

US 2008/0069662 A1    Mar. 20, 2008

(30) Foreign Application Priority Data

Sep. 15, 2006 (JP) ................... 2006-251211

(51) Int. Cl.
*F16B 39/32* (2006.01)
(52) U.S. Cl. .......................... 24/297; 24/336
(58) Field of Classification Search .............. 24/297, 24/326, 336, 545, 555, 295
See application file for complete search history.

(56) References Cited

U.S. PATENT DOCUMENTS

| 4,437,633 | A | * | 3/1984 | Andre | 248/68.1 |
| 5,104,272 | A | | 4/1992 | Dupont et al. | |
| 5,460,342 | A | * | 10/1995 | Dore et al. | 248/74.2 |
| 5,605,424 | A | | 2/1997 | Boville et al. | |
| 5,947,426 | A | * | 9/1999 | Kraus | 248/74.2 |
| 6,883,762 | B2 | * | 4/2005 | Miura et al. | 248/74.2 |

FOREIGN PATENT DOCUMENTS

| JP | 2005145222 A | 6/2005 |
| JP | 2005145286 A | 6/2005 |
| WO | WO 03/071904 A1 | 9/2003 |

* cited by examiner

*Primary Examiner* — James Brittain
(74) *Attorney, Agent, or Firm* — Michael P. Leary

(57) ABSTRACT

A structure for attaching to a support a protective member having a rib comprises a single-piece clip with a rib-fastening section and a support-fastening section. The rib-fastening section has a pair of walls defining a space into which the rib is inserted, and the walls have respective resilient pawls that engage opposite sides of the rib to resist withdrawal of the rib from the space. The walls have reinforcing braces outside the space. The support-fastening section has a tube with a tapered lead-in member for receiving a stud projecting from the support.

13 Claims, 5 Drawing Sheets

US 8,011,068 B2

STRUCTURE FOR ATTACHING PROTECTIVE MEMBER TO A SUPPORT

CROSS-REFERENCE TO RELATED APPLICATION

This application claims the benefit of Japanese Patent Application No. 2006-251211 filed Sep. 15, 2006, incorporated herein by reference.

BACKGROUND OF THE INVENTION

This invention relates to a structure for attaching a protective member (e.g., a footrest or a tibia pad) to a support. The protective member may be made of a soft impact-absorbing material, and the support may be a vehicle body panel forming a base for the protective member.

Various structures are known for attaching a protective member or other member, such as a tibia pad, to a support, such as a floor panel of a vehicle. As examples of the prior art, see Japanese Patent Laid-Open Publication No. 2005-14522A, Japanese Patent Laid-Open Publication No. 2005-145286A, U.S. Pat. No. 5,104,272, International Publication No. WO 2003/071904 and U.S. Pat. No. 5,605,424. In general, the prior art is deficient or disadvantageous in one or more respects, including the need for multiple attaching pieces, the need for a mounting hole or through-hole, and the need for structures that are complex in their configuration or mode of operation.

BRIEF DESCRIPTION OF THE INVENTION

The present invention provides a simple structure for attaching a protective member (or other member) to a support or workpiece, using a single-piece clip that can be attached to the protective member and to the support merely by a pushing operation, and without the need for a mounting hole or a through-hole.

In one embodiment, the protective member has a rib, and the clip has a rib-fastening section and a support-fastening section. The rib-fastening section is designed to receive and engage the rib, and the support-fastening section is designed to receive and engage a stud, for example, projecting from a support. The rib may be part of a soft member, such as a footrest or tibia-protective member. In a preferred embodiment, the support-fastening section is designed to engage a stud with an engaging force that is less than an engaging force that holds the rib in the rib-fastening section.

BRIEF DESCRIPTION OF THE DRAWINGS

The invention will be further described in conjunction with the accompanying drawings, which illustrate a preferred (best mode) embodiment and wherein.

DETAILED DESCRIPTION OF THE INVENTION

Figure 7:
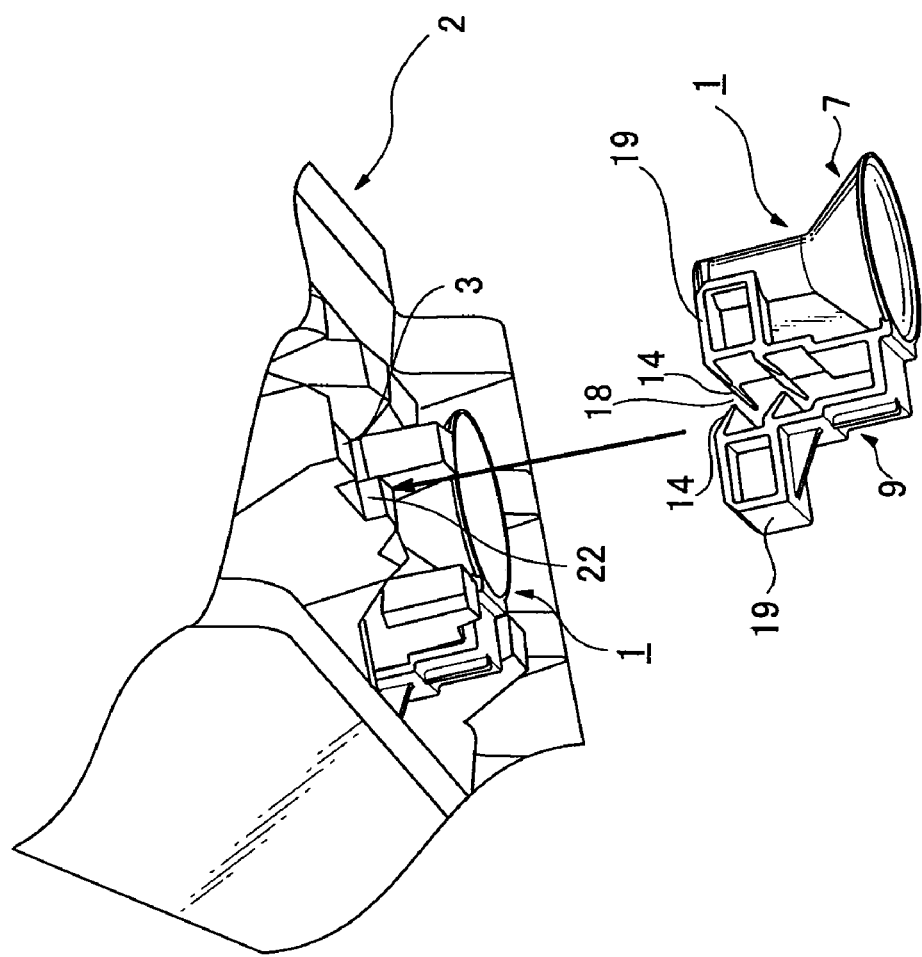
FIG. 7 is a diagrammatic fragmentary perspective view explaining an operation of fixing the clip to a footrest.
Figure 9:
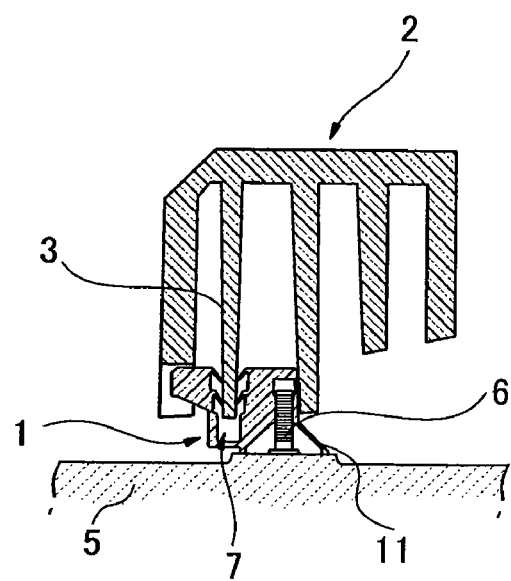
FIG. 9 is a sectional view taken along line A-A in FIG. 8.

A clip 1 in accordance with an embodiment of the invention is a single-piece of molded hard plastic, comprising a support-fastening section 7, by which the clip is attached to a support such as a vehicle body panel, and a rib-fastening section 9, by which the clip is attached to a rib of a protective or other member. A protective member 2 with a flat plate rib 3 is shown in FIGS. 7 and 9, for example. In the embodiment, the support-fastening section 7 engages a stud 6 on a support 5, as shown in FIG. 9, for example.

Figure 1:
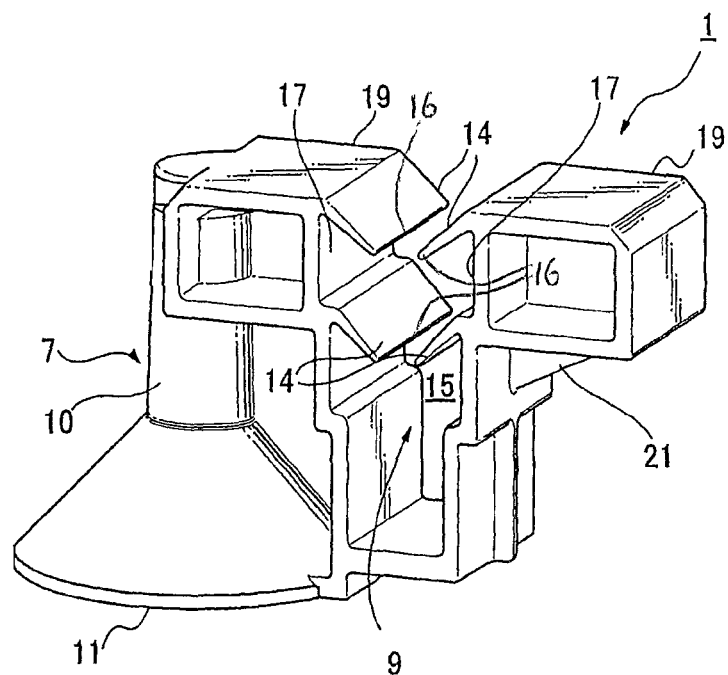
FIG. 1 is a perspective view of a clip according to the invention.
Figure 2:
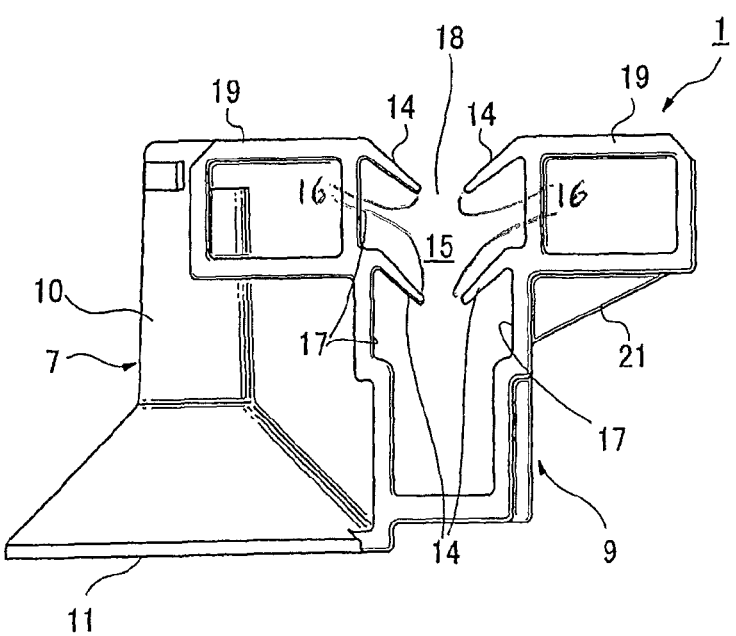
FIG. 2 is a front view of the clip.
Figure 3:
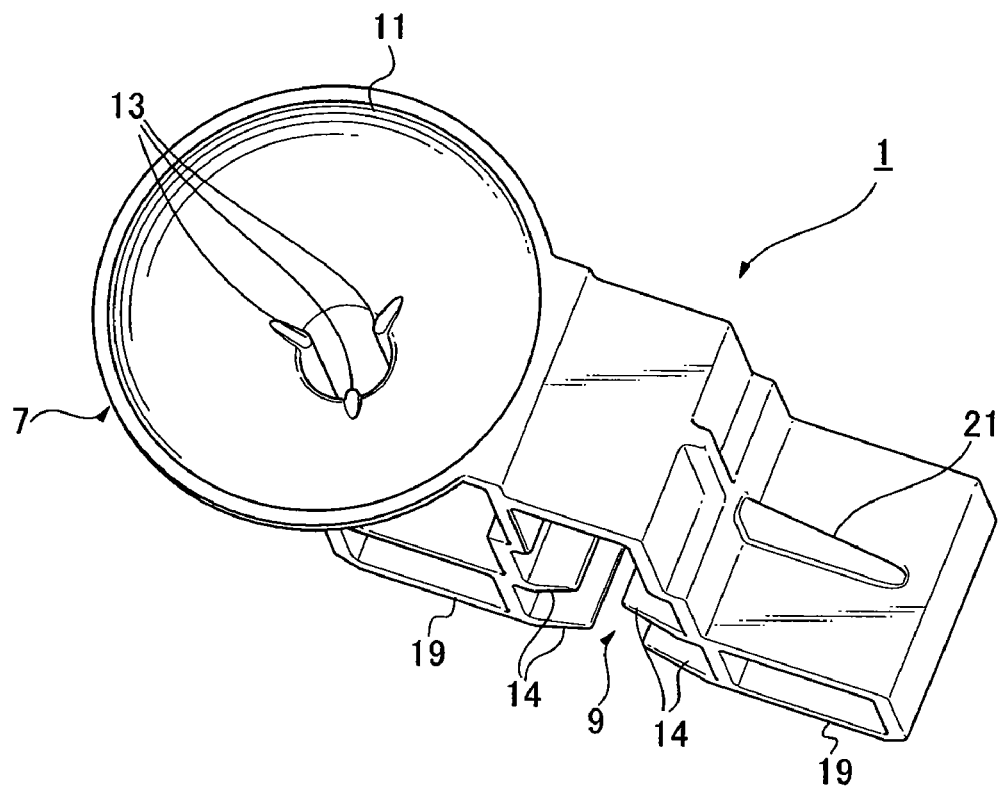
FIG. 3 is a perspective view of the clip viewed from a bottom side of the clip.
Figure 4:
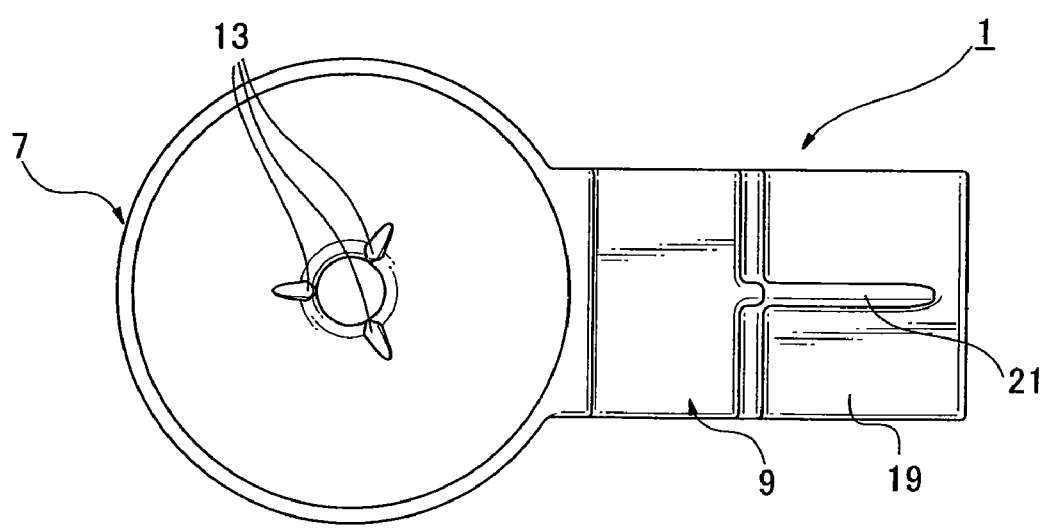
FIG. 4 is a bottom plan view of the clip.
Figure 5:
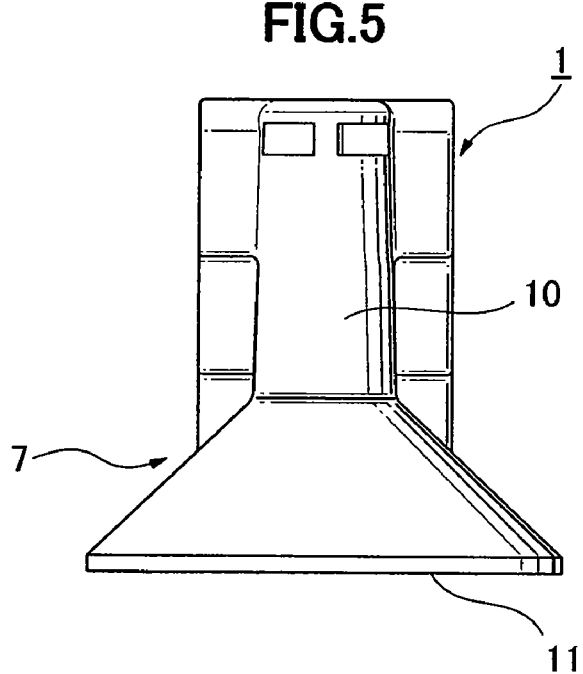
FIG. 5 is a left side view of the clip.
Figure 6:
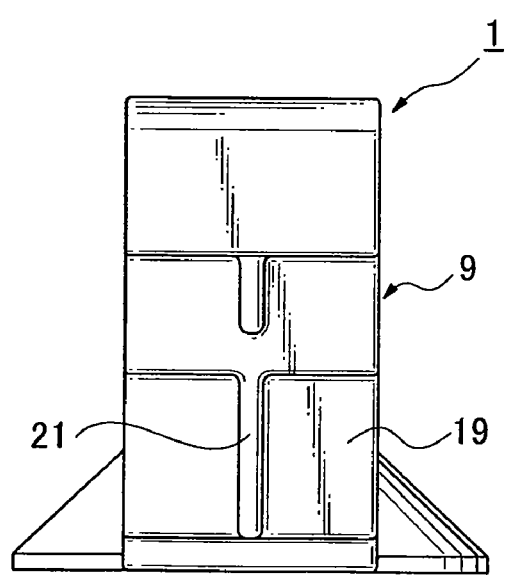
FIG. 6 is a right side view of the clip.

In the embodiment, the support-fastening section 7 has a tube 10 for receiving the stud 6 via a tapered lead-in member 11 with an opening at a bottom side of the clip 1. The tube 10 has a plurality of protrusions 13 (see FIGS. 3 and 4) extending longitudinally inside the tube for engaging and holding the stud 6.

The rib-fastening section 9 of the clip 1 has a pair of substantially parallel walls 17 defining a space 15 for receiving the rib 3 via an inlet 18 at a top side of the clip. At least one pair of resilient pawls 14 (two pairs in the embodiment) project into the space 15 from the respective walls 17. The pawls of each pair are plates hinged at their root ends on the respective walls 17 and angulated away from the inlet 18 and toward one another. Tips 16 of the pawls are opposed to one another and are disposed to engage opposite sides of a rib 3 formed as a plate.

Each wall 17 is reinforced by a brace, which, in the embodiment, is a rectangular box-frame 19 outside the space 15. One of the box-frames 19 extends from a corresponding wall 17 to the tube 10. The other box-frame 19 extends from the other wall 17 outwardly of the clip and is connected to the other wall by a reinforcing fin 21.

FIG. 7 shows a clip 1 of the invention about to be pushed onto a rib 3 of a footrest 2. The footrest has a recess 22 for receiving the clip as the rib 3 is pushed through the inlet 18 past the pawls 14.

Figure 8:
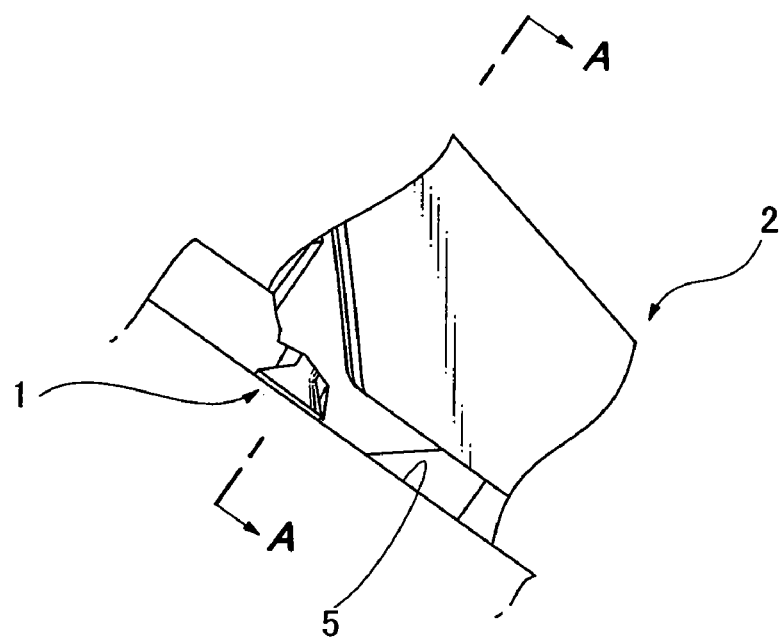
FIG. 8 is a fragmentary side view showing the footrest attached to a vehicle body panel.

FIGS. 8 and 9 show the footrest 2 mounted on a floor panel 5 of a vehicle using the clip 1 of the invention, after the rib-fastening section 7 is pushed onto the rib, and a stud 6 projecting from the floor panel 5 into the tapered lead-in member 11 of the support-fastening section.

In the embodiment, it is preferred that the engaging force of the protrusions 13 with the stud 6 is less than the engaging force of the pawls 14 with the rib 3, so that the footrest can be removed from the floor panel 5 with the clip 1 held to the footrest as a unit. For this reason, there is no pawl in the tube 10 engaging threads or grooves of the stud, but only the elongated protrusions 13 that engage the thread crests or outer surface of the stud. Withdrawal of the rib 3 from the rib-fastening section 9 is resisted by the pawls 14, the angulation of which permits easy insertion of the rib into the space 15, with the tips of the pawls sliding on opposite sides of the rib, but resists withdrawal of the rib, by virtue of the tips 16 of the pawls 14 biting into opposite sides of the rib. The rib 3 is pinched between the pairs of pawls 14 when it is inserted into the space 15, and the pinching of the rib resists movement of the rib in a pull-out direction opposite to the direction in which the rib is pushed into the space 15. The tips 16 of the pawls may be tapered to a pointed tip 16 to assist in this action. The reinforcing braces 19 prevent outward bending of the walls 17 that would tend to release the engagement of the pawls 14 with the rib 3.

In the embodiment shown in FIG. 7, two clips 1 are used to engage two ribs 3 at appropriate positions of the rear surface of the footrest 2. The floor panel of the vehicle is, of course, provided with two appropriately spaced studs to be engaged by the support-fastening sections of the two clips.

Although the invention has been described in detail with regard to the attachment of a soft footrest 2 to a vehicle body panel 5, the protective member of a soft material may be a tibia pad or an insulator, for example. Furthermore, the invention may be used in an environment in which a protective member of soft material is a transport member wrapped around a liquid-crystal display or monitor panel, for example, with the clip 1 used for attaching such a transport member to a support. While a rod-shaped stud is used in the embodiment described, other types of devices may be used to fasten the clip to a support.

It is apparent from the foregoing description that changes can be made in the embodiment described without departing from the principles and spirit of the invention, the scope of which is defined in the accompanying claims.

What is claimed is:

1. A single-piece clip for attaching a protective member incorporating a rib constructed of a soft material to a support, wherein the clip comprises: a rib-fastening section and a support-fastening section, wherein the rib-fastening section has a pair of walls defining a space for receiving the rib of the protective member, with a pair of resilient pawls extending from the respective walls and disposed to engage the rib inserted into an inlet end of the space, at one side of the clip, the pawls being constructed to resist movement of the rib in a direction opposite to a direction of insertion of the rib into the space through the inlet end, and wherein the support-fastening section is located beside the rib-fastening section and is constructed for fastening to a support at an opposite side of the clip; and wherein the support-fastening section includes protrusions constructed to engage a stud on the support and the construction of the pawls is related to the construction of the protrusions so that a stud-holding force of the protrusions is less than a rib-holding force of the pawls.

2. The clip of claim 1, wherein the walls are substantially parallel sidewalls of a U-shaped space, and the pawls are plates hinged at root ends on the respective walls and angulated away from the inlet end of the space, with tips of the plates disposed in opposition to one another to engage opposite sides of the rib inserted into the space through the inlet end of the space.

3. The clip of claim 2, wherein the walls are reinforced by braces outside of the space.

4. The clip of claim 3, wherein the braces are box-frames.

5. The clip of claim 4, wherein one of the box-frames extends between one of the walls and the support-fastening section, and the other box-frame extends from the other wall outwardly of the clip.

6. The clip of claim 1, wherein the support-fastening section has a tube with a tapered lead-in member extending from an inlet at the opposite side of the clip.

7. The clip of claim 6, wherein the tube has the protrusions extending inwardly to engage a stud on the support.

8. The clip of claim 7, wherein the pawls each include a pointed tip adapted to slide over the rib during movement relative to the rib in a first direction and to dig into the soft material of the rib during movement relative to the rib in a second direction opposite to the first direction.

9. The clip of claim 7, wherein the protrusions consist of a plurality of ribs arranged around an interior circumference of the tube and the ribs project radially inward and extend longitudinally in the axial direction of the tube.

10. A structure for attaching a member having a rib to a support including an attachment stud comprising:

a single-piece clip having a rib-fastening section and a support-fastening section, wherein the rib-fastening section has a pair of walls defining a space for receiving the rib inserted into the space through an inlet to the space at one side of the clip, wherein a pair of resilient pawls project into the space from the respective walls and are angulated away from the inlet and toward one another, with tips opposed to one another and disposed to engage opposite sides of the rib, wherein the support-fastening section is disposed to be fastened to the stud at an opposite side of the clip, and wherein the support-fastening section includes protrusions constructed to engage the stud on the support and the construction of the pawls is related to the construction of the protrusions so that a stud-holding force of the protrusions is less than a rib-holding force of the pawls.

11. The structure of claim 10, wherein the support-fastening section has a tube with a tapered lead-in member extending to the tube from an inlet at the opposite side of the clip for receiving the stud projecting from the support, and wherein the tube has protrusions extending inwardly for engaging and holding the stud in the tube.

12. The structure of claim 11, wherein each wall has a reinforcing brace outside of the space.

13. The structure of claim 12, wherein the reinforcing braces are box-frames, one of which extends from one of the walls to the tube and the other of which extends from the other wall outwardly of the clip and is joined to the other wall by a fin.

* * * * *